United States Patent
Wang et al.

(10) Patent No.: US 11,901,998 B2
(45) Date of Patent: Feb. 13, 2024

(54) DEVICES, METHODS AND COMPUTER PROGRAMS FOR TWO-WAY BEAM FAILURE RECOVERY IN WIRELESS COMMUNICATIONS

(71) Applicant: HUAWEI TECHNOLOGIES CO., LTD., Guangdong (CN)

(72) Inventors: Peng Wang, Kista (SE); Majid Nasiri Khormuji, Kista (SE); Branislav M. Popovic, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 173 days.

(21) Appl. No.: 17/029,937

(22) Filed: Sep. 23, 2020

(65) Prior Publication Data
US 2021/0006321 A1    Jan. 7, 2021

Related U.S. Application Data

(63) Continuation of application No. PCT/EP2018/057936, filed on Mar. 28, 2018.

(51) Int. Cl.
```
H04B 7/06      (2006.01)
H04B 7/08      (2006.01)
H04W 16/28     (2009.01)
H04W 76/19     (2018.01)
```

(52) U.S. Cl.
CPC .......... *H04B 7/0695* (2013.01); *H04B 7/088* (2013.01); *H04W 16/28* (2013.01); *H04W 76/19* (2018.02)

(58) Field of Classification Search
CPC ..... H04B 7/0695; H04B 7/088; H04W 76/19; H04W 16/28
See application file for complete search history.

(56) References Cited

U.S. PATENT DOCUMENTS

2018/0042000 A1* 2/2018 Zhang .................. H04W 72/23
2018/0054348 A1  2/2018 Luo et al.
(Continued)

FOREIGN PATENT DOCUMENTS

CN    101291164 A    10/2008
CN    107079459 A    8/2017
(Continued)

OTHER PUBLICATIONS

3GPP TS 38.214 V15.0.0 (Dec. 2017), "3rd Generation Partnership Project; Technical Specification Group Radio Access Network; NR; Physical layer procedures for data (Release 15)," Dec. 2017, 71 pages.
(Continued)

*Primary Examiner* — Jeffrey M Rutkowski
*Assistant Examiner* — Christopher Nguyen
(74) *Attorney, Agent, or Firm* — Fish & Richardson P.C.

(57) ABSTRACT

Example wireless communications methods and apparatus with two-way beam failure recovery are disclosed. One example method includes receiving a downlink beam failure recovery request by a network device from a client device indicating at least one new downlink candidate beam determined to replace at least one failed downlink beam. The network device detects at least one failed uplink beam, determines at least one new uplink candidate beam to replace the detected at least one failed uplink beam, and generates uplink redirection information indicating the determined at least one new uplink candidate beam. A response including the generated uplink redirection information is generated by the network device, and transmitted to the client device.

19 Claims, 5 Drawing Sheets

(56) References Cited

U.S. PATENT DOCUMENTS

| | | | |
|---|---|---|---|
| 2018/0227899 A1* | 8/2018 | Yu | H04W 74/08 |
| 2018/0249526 A1* | 8/2018 | Nagaraja | H04W 24/08 |
| 2018/0288756 A1* | 10/2018 | Xia | H04W 74/006 |
| 2018/0367374 A1* | 12/2018 | Liu | H04W 76/18 |
| 2019/0110281 A1* | 4/2019 | Zhou | H04W 76/19 |
| 2022/0248339 A1* | 8/2022 | Fukui | H04W 52/34 |

FOREIGN PATENT DOCUMENTS

| | | |
|---|---|---|
| CN | 107612602 A | 1/2018 |
| WO | 2017196612 A1 | 11/2017 |

OTHER PUBLICATIONS

3GPP TS 38.213 V15.0.0 (Dec. 2017), "3rd Generation Partnership Project; Technical Specification Group Radio Access Network; NR; Physical layer procedures for control (Release 15)," Dec. 2017, 56 pages.

Catt, "Consideration on beam failure recovery," 3GPP TSG RAN WG1 Meeting 90bis, R1-1717813, Prague, CZ, Oct. 9-13, 2017, 5 pages.

Huawei et al., "UL SRS design for CSI acquisition and beam management," 3GPP TSG RAN WG1 Meeting #88bis, R1-1704241, Spokane, USA, Apr. 3-7, 2017, 16 pages.

InterDigital, Inc., "Remaining issues on beam recovery," 3GPP TSG RAN WG1 Meeting #90bis, R1-1718483, Prague, Czech Republic, Oct. 9-13, 2017, 4 pages.

PCT International Search Report and Written Opinion issued in International Application No. PCT/EP2018/057936 on Nov. 28, 2018, 16 pages.

Samsung, "Corrections on UL Beam Management," 3GPP TSG RAN WG1 Meeting #92, R1-1801965, Athens, Greece, Feb. 26-Mar. 2, 2018, 6 pages.

Office Action in Chinese Application No. 201880091290.1, dated May 25, 2021, 23 pages.

* cited by examiner

DEVICES, METHODS AND COMPUTER PROGRAMS FOR TWO-WAY BEAM FAILURE RECOVERY IN WIRELESS COMMUNICATIONS

CROSS-REFERENCE TO RELATED APPLICATIONS

This application is a continuation of International Application No. PCT/EP2018/057936, filed on Mar. 28, 2018, the disclosure of which is hereby incorporated by reference in its entirety.

TECHNICAL FIELD

The present disclosure relates to the field of wireless communications, and more particularly to network node devices, client devices, and related methods and computer programs.

BACKGROUND

Different from traditional long-term evolution (LTE) and LTE-Advanced (LTE-A) based cellular communication networks that mostly work at low frequencies below 3 gigahertz (GHz), the fifth generation (5G) or so called new radio (NR) wireless networks need to also operate on higher frequency bands, including millimeter wave (mmWave) frequencies, to solve spectrum shortage issues. As a consequence, signals transmitted over these frequencies are prone to a larger propagation loss than before. To mitigate this high signal propagation loss, directional signal transmission using beamforming is applied, which shapes the radiation patterns of the transmitted signals such that signal power can be confined within certain angular directions, and at the same time interference to other communication links in the system can be avoided or mitigated.

To allow high beamforming gain in a beam-based communication link between the transmitter and receiver, the directions of the transmit and receive beams need to be aligned with the direction of departure (DoD) and direction of arrival (DoA), or equivalently angle of departure (AoD) and angle of arrival (AoA), of strong channel paths, respectively, and at the same time it needs to be ensured that such a beam pair link (BPL) is not blocked by any obstacles, such as a car, pedestrian, foliage or even the hand/head/body of the person holding the transmitter/receiver. Otherwise, when beam misalignment and/or blockage occurs, the achievable beamforming gain and in turn the link quality drop significantly. This phenomenon is referred to as "beam failure".

The beam failure is different from the phenomenon of radio link failure (RLF) in LTE/LTE-A based systems with (quasi) omni-directional transmissions. In such LTE/LTE-A based systems, RLF usually occurs when the transmitter and receiver are far away from each other (e.g. when the user equipment (UE) is located at a cell edge) and the link quality drops mainly due to increased path loss. In this case, there is no other way to recover the failed link but to re-establish the radio link based on random access operation to an available base station (BS) or next generation node B (gNB) that is closer to UE than the previous serving BS. Such an RLF recovery procedure usually involves higher-layer radio resource control (RRC) and is therefore time consuming. In comparison, when beam failure occurs in 5G high-frequency systems, it is possible that there still exists another BPL with satisfactory link quality to replace the failed BPL. The procedure of finding such a BPL to replace the failed BPLs is referred to as beam failure recovery (BFR), which can be performed in the physical layer only and which does not involve time-consuming RRC in the higher layer. Therefore, when the beam failure occurs in 5G NR systems, it is usually preferable to first try to recover the link by BFR so as to reduce the system latency and outage probability. Only if BFR fails within a specified time window, one should announce RLF and trigger the RLF recovery.

However, current beam failure recovery procedures are unable to promptly perform joint UL and DL beam failures in the physical layer which can cause unnecessary link outage. Specifically, the BFR mechanism in state-of-art solutions do not support wireless Virtual Reality (VR) and Augmented Reality (AR) applications, due to excessive link outage time (larger than the maximum allowed VR/AR delay of 20 ms) that arises when both UL and DL are simultaneously obstructed. Currently, UL and DL beam failures are detected and recovered by two separate procedures, i.e. UL beam management and UE-initiated BFR mechanism. When both UL and DL beam failures occur, the UL beam management and UE-initiated BFR can be performed at the same time by the network device and the client device, respectively, but they cannot be successful at the same time. This is because the UE-initiated BFR can enable the DL beam failure to be successfully recovered even in the presence of UL beam failure (e.g., by allowing BFR request transmission via Physical Random Access Channel (PRACH) in a beam sweeping manner). While the UL BFR based on UL beam management needs to assume that the current PDCCH does not fail, such that the gNB can indicate the UE about Sounding Reference Signal Resource Indicator (SRI) configuration and new UL beam index via the existing PDCCH. Otherwise the UL redirection information transmitted by the base station cannot reach the UE. Therefore, although the base station can perform the operations related to UL beam failure recovery directly after detecting the UL beam failure, it may need to keep transmitting UL redirection information until a failed existing physical downlink control channel (PDCCH) is recovered. In other words, when both UL and DL beams fail simultaneously, the DL and UL BFR procedures have to be done sequentially, i.e., the UL BFR procedure can be in effect only after the DL BFR has finished successfully. However, under the lowest-latency configuration for UE-initiated BFR of the state-of-art, the latency involved in DL BFR could amounts to at least 20 ms, including 10 ms for beam failure detection and 10 ms for BFR request transmission via PRACH. Hence the DL BFR latency is already on the edge of VR/AR delay requirement, and there is no sufficient time to further perform UL BFR. Hence such sequential DL and UL beam failure recoveries may cause significant time delays, and there is a crucial need to reduce the delay of current BFR mechanism to support key vertical industries of 5G including VR and AR applications.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the disclosure to provide two-way beam failure recovery in wireless communications. The foregoing and other objects are achieved by the features of the independent claims. Further implementation forms are apparent from the dependent claims, the description and the figures.

According to a first aspect, a network node device is provided. The network node device comprises a transceiver and a processor. The transceiver is configured to receive a downlink beam failure recovery request from a client device. The downlink beam failure recovery request indicates at least one new downlink candidate beam that has been determined to replace at least one failed downlink beam. The processor is configured to detect at least one failed uplink beam. The processor is further configured to determine at least one new uplink candidate beam to replace the detected at least one failed uplink beam. The processor is further configured to generate uplink redirection information. The uplink redirection information indicates the determined at least one new uplink candidate beam. The processor is further configured to generate a response to the received downlink beam failure recovery request, where the response comprises the generated uplink redirection information. The transceiver is further configured to transmit the generated response to the client device. The disclosure allows a two-way beam failure recovery mechanism e.g. in 5G NR wireless networks. The disclosed two-way BFR mechanism allows the joint recovery of DL and UL beam failures in one BFR procedure which can be done promptly before the radio link failure recovery procedure is trigged. Accordingly, long-lasting link outages can be prevented. Thus, the disclosure allows reducing the excessive link outage time and enables 5G applications with more stringent delay requirements such as VR and AR.

In an implementation form of the first aspect, the at least one new uplink candidate beam is determined based on the reception of the downlink beam failure recovery request from the client device. This thus enables an UL beam sounding using the already available downlink beam failure recovery request signals. One advantage of this implementation form is that it reduces the delay, e.g., in the case that the network node device is unable to configure the sounding reference signal (SRS) transmission for determining a new uplink candidate beam, or it doesn't determine a new uplink candidate beam based on the available SRS reception timely. A second advantage of this implementation form is that it increases the probability of successfully identifying a new uplink candidate beam, e.g., in the case that the network node device is unable to determine a new candidate beam based on SRS reception. A third advantage of this implementation form is that it can determined a new uplink candidate beam with better and more accurate channel quality, e.g., in the case when the earlier SRS used for new uplink candidate beam identification has been outdated. A forth advantage of this implementation form is that it can reduce the system UL overhead, as it is unnecessary to schedule new SRS transmission for new uplink candidate beam identification during the uplink beam failure.

In an implementation form of the first aspect, the determination of the at least one new uplink candidate beam based on the reception of the downlink beam failure recovery request comprises determining the at least one new uplink candidate beam based on a time and frequency location of the received downlink beam failure recovery request. This is enabled when the uplink beam used by the client device for transmitting the downlink beam failure recovery request is associated with the time and frequency resource location of the transmitted downlink beam failure recovery request. Under the mild assumption of loose time and frequency synchronization between the network node device and the client device, the network node device is able to derive the associated uplink beam index used to transmit the downlink beam failure recovery request that is received by the network node device via counting the received downlink beam failure recovery request in time and frequency domain. This is advantageous as the uplink beam index information can be implicitly carried in the downlink beam failure recovery request transmission and there is no need to contain this information explicitly. Hence the overhead of the downlink beam failure recovery request can be reduced.

In an implementation form of the first aspect, the determination of the at least one new uplink candidate beam based on the reception of the downlink beam failure recovery request comprises determining the at least one new uplink candidate beam based on a preamble in the received downlink beam failure recovery request. This is enabled when the uplink beam used by the client device for transmitting the downlink beam failure recovery request is associated with the preamble used for the transmitted downlink beam failure recovery request. By this means, the network node device is able to derive the associated uplink beam index that is used to transmit the downlink beam failure recovery request that is received by the network node device via determining the preamble used by the received downlink beam failure recovery request. This is advantageous as the uplink beam index information can be implicitly carried in the downlink beam failure recovery request transmission and there is no need to contain this information explicitly. Hence the overhead of the downlink beam failure recovery request can be reduced.

In an implementation form of the first aspect, the determination of the at least one new uplink candidate beam based on the reception of the downlink beam failure recovery request comprises determining the at least one new uplink candidate beam based on the combination of a preamble in the received downlink beam failure recovery request and the time and frequency resource location where the downlink beam failure recovery request is received. This is enabled when the uplink beam used by the client device for transmitting the downlink beam failure recovery request is associated with the combination of the preamble and time-frequency resource location used for the transmitted downlink beam failure recovery request. By this means, the network node device is able to derive the associated uplink beam index that is used to transmit the downlink beam failure recovery request that is received by the network node device via determining the combination of the preamble and time-frequency resource location used by the received downlink beam failure recovery request. This is advantageous as the uplink beam index information can be implicitly carried in the downlink beam failure recovery request transmission and there is no need to contain this information explicitly. Hence the overhead of the downlink beam failure recovery request can be reduced. In addition, it provides more flexibility for the downlink beam failure recovery request to carry the uplink beam index information in an implicitly way.

In an implementation form of the first aspect, the determination of the at least one new uplink candidate beam comprises determining the at least one new uplink candidate beam based on a sounding reference signal received from the client device. This is possible if the sounding reference signal has already been configured for transmission, e.g., in a periodical manner, before the uplink and/or downlink beam failure occurs, and is thus available for the network node device to determine a new uplink candidate beam based on its reception quality. An advantage of this implementation form is that the channel quality of the determined new uplink candidate beam can be improved, as the new uplink candidate beam determined by reception of the sounding reference signal may have a better channel quality than that determined based on the reception of downlink beam failure recovery request. Hence the network node device is able to select a new uplink candidate beam with a better channel quality, such that the performance of the subsequent uplink transmission can be improved.

In an implementation form of the first aspect, the generated uplink redirection information comprises at least one of: an indication of the identity of the client device, an indication of the detected at least one failed uplink beam, or an identification of the determined at least one new uplink candidate beam. All these elements can be comprised in the generated uplink redirection information either explicitly or implicitly. For example, the identity of the client device can be indicated by either an explicit cell radio network temporary identifier (C-RNTI) or can be derived from the response to the downlink beam failure recovery request that is scrambled by the C-RNTI. The detected at least one failed uplink beam can be indicated either using an explicit bit contained in the uplink redirection information, or implicitly by comparing whether the indicated identification of the determined at least one new uplink candidate beam is the same as or different from the uplink beams that have been used previously. The identification of the determined at least on new uplink candidate beam can be indicated either explicitly by a bit string contained in the generated uplink redirection information, or implicitly by an association to the time-frequency resource location over which the generated response to the downlink beam failure recovery request comprising the generated uplink redirection information is transmitted. This is advantageous as the identity of the client device can help the client device to determine whether the received response to the beam failure recovery request comprising the uplink redirection information is intended to him or another client device. The indication of the detected at least one failed uplink beam can help the client device to derive whether an uplink beam failure occurs and where the subsequent uplink transmission should be redirected to a new uplink beam. The identification of the determined at least one new uplink candidate beam can help the client device to determine how the subsequent uplink transmission can be redirected. Another advantage of this implementation form is that this information allows an agile link management and scheduling and can also be used for interference management in multi-user scenarios.

In an implementation form of the first aspect, the transceiver is further configured to transmit the generated response via the indicated at least one new downlink candidate beam. This is advantageous as the indicated at least one new downlink candidate beam has been confirmed by the client device to have satisfactory channel quality, and thus it is guaranteed that the generated response can successfully reach the client device.

In an implementation form of the first aspect, the generated response comprises a downlink control information format 0_1. This is advantageous as there is no need to define a new downlink control information format. Specifically, when the new uplink candidate beam is determined based on the reception of sounding reference signal, it can be implicitly carried by the field of sounding reference signal resource indicator in the downlink control information format 0_1. From this field the client device can derive the determined new uplink candidate beam based on the association between the uplink beam used for sounding reference signal transmission and the transmitted sounding reference signal. When the new uplink candidate beam is determined based on the reception of the downlink beam failure recovery request, a certain previously determined information field, e.g., the sounding reference signal resource indicator, can be given a new meaning to carry the index of the PRACH attempt over which the downlink beam failure recovery request is received by the network node device. From this field the client device can derive the determined new uplink candidate beam based on the association between the uplink beam used for PRACH-based downlink beam failure recovery request transmission and the index of the PRACH attempt over which the downlink beam failure recovery request is transmitted. Another advantage of this is that the other field of the downlink control information format 0_1 can be used to carry the necessary parameters required for scheduling the subsequent uplink transmission, such that the subsequent uplink transmission can adapt to the channel quality of the determined new uplink beam.

In an implementation form of the first aspect, the transceiver is further configured to receive a response to the transmitted uplink redirection information from the client device. This is advantageous as the network node device can make sure that the client device has successfully received the transmitted uplink redirection information and is prepared for redirecting the uplink transmission to the determined at least one new uplink candidate beam.

In an implementation form of the first aspect, the response to the transmitted uplink redirection information from the client device is received via the determined at least one of the uplink new candidate beam. This is advantageous as the determined at least one of the uplink new candidate beam has been confirmed by the network node device to have satisfactory channel quality and thus it is guaranteed that the response to the transmitted uplink redirection can successfully reach the network node device.

In an implementation form of the first aspect, the received downlink beam failure recovery request comprises at least one of: an indication of the identity of the client device, or an identification of the determined at least one new downlink candidate beam. This is advantageous as it allows the network node device to receive necessary downlink redirection information to establish the subsequent downlink transmissions.

According to a second aspect, a method is provided. The method comprises receiving, from a client device by a network node device, a downlink beam failure recovery request indicating at least one new downlink candidate beam determined to replace at least one failed downlink beam. The method further comprises detecting, by the network node device, at least one failed uplink beam. The method further comprises determining, by the network node device, at least one new uplink candidate beam to replace the detected at least one failed uplink beam. The method further comprises generating, by the network node device, uplink redirection information indicating the determined at least one new uplink candidate beam. The method further comprises generating, by the network node device, a response comprising the generated uplink redirection information. The method further comprises transmitting, by the network node device, the generated response to the client device. The disclosure allows a two-way beam failure recovery mechanism e.g. in 5G NR wireless networks. The disclosed two-way BFR mechanism allows the joint recovery of DL and UL beam failures in one BFR procedure which can be done promptly before the radio link failure recovery procedure is triggered.

Accordingly, long-lasting link outages can be prevented. Thus, the disclosure allows smooth communication between an UE and a base station in both UL and DL with shorter latency that enables vertical 5G industries including VR and AR applications.

In an implementation form of the second aspect, the at least one new uplink candidate beam is determined based on the reception of the downlink beam failure recovery request from the client device. This thus enables an UL beam sounding using the already available downlink beam failure recovery request signals. One advantage of this implementation form is that it reduces the delay, e.g., in the case that the network node device is unable to configure the sounding reference signal (SRS) transmission for determining a new uplink candidate beam, or it doesn't determine a new uplink candidate beam based on the available SRS reception timely. A second advantage of this implementation form is that it increases the probability of successfully identifying a new uplink candidate beam, e.g., in the case that the network node device is unable to determine a new candidate beam based on SRS reception. A third advantage of this implementation form is that it can determined a new uplink candidate beam with better and more accurate channel quality, e.g., in the case when the earlier SRS used for new uplink candidate beam identification has been outdated. A forth advantage of this implementation form is that it can reduce the system UL overhead, as it is unnecessary to schedule new SRS transmission for new uplink candidate beam identification during the uplink beam failure.

In an implementation form of the second aspect, the determination of the at least one new uplink candidate beam based on the reception of the downlink beam failure recovery request comprises determining the at least one new uplink candidate beam based on a time and frequency location of the received downlink beam failure recovery request. This is enabled when the uplink beam used by the client device for transmitting the downlink beam failure recovery request is associated with the time and frequency resource location of the transmitted downlink beam failure recovery request. Under the mild assumption of loose time and frequency synchronization between the network node device and the client device, the network node device is able to derive the associated uplink beam index used to transmit the downlink beam failure recovery request that is received by the network node device via counting the received downlink beam failure recovery request in time and frequency domain. This is advantageous as the uplink beam index information can be implicitly carried in the downlink beam failure recovery request transmission and there is no need to contain this information explicitly. Hence the overhead of the downlink beam failure recovery request can be reduced.

In an implementation form of the second aspect, the determination of the at least one new uplink candidate beam based on the reception of the downlink beam failure recovery request comprises determining the at least one new uplink candidate beam based on a preamble in the received downlink beam failure recovery request. This is enabled when the uplink beam used by the client device for transmitting the downlink beam failure recovery request is associated with the preamble used for the transmitted downlink beam failure recovery request. By this means, the network node device is able to derive the associated uplink beam index used to transmit the downlink beam failure recovery request that is received by the network node device via determining the preamble used by the received downlink beam failure recovery request. This is advantageous as the uplink beam index information can be implicitly carried in the downlink beam failure recovery request transmission and there is no need to contain this information explicitly. Hence the overhead of the downlink beam failure recovery request can be reduced.

In an implementation form of the second aspect, the determination of the at least one new uplink candidate beam based on the reception of the downlink beam failure recovery request comprises determining the at least one new uplink candidate beam based on the combination of a preamble in the received downlink beam failure recovery request and the time and frequency resource location where the downlink beam failure recovery request is received. This is enabled when the uplink beam used by the client device for transmitting the downlink beam failure recovery request is associated with the combination of the preamble and time-frequency resource location used for the transmitted downlink beam failure recovery request. By this means, the network node device is able to derive the associated uplink beam index used to transmit the downlink beam failure recovery request that is received by the network node device via determining the combination of the preamble and time-frequency resource location used by the received downlink beam failure recovery request. This is advantageous as the uplink beam index information can be implicitly carried in the downlink beam failure recovery request transmission and there is no need to contain this information explicitly. Hence the overhead of the downlink beam failure recovery request can be reduced. In addition, it provides more flexibility for the downlink beam failure recovery request to carry the uplink beam index information in an implicitly way.

In an implementation form of the second aspect, the determination of the at least one new uplink candidate beam comprises determining the at least one new uplink candidate beam based on a sounding reference signal received from the client device. This is possible if the sounding reference signal has already been configured for transmission, e.g., in a periodical manner, before the uplink and/or downlink beam failure occurs, and is thus available for the network node device to determine a new uplink candidate beam based on its reception quality. An advantage of this implementation form is that the channel quality of the determined new uplink candidate beam can be improved, as the new uplink candidate beam determined by reception of the sounding reference signal may have a better channel quality than that determined based on the reception of downlink beam failure recovery request. Hence the network node device is able to select a new uplink candidate beam with a better channel quality, such that the performance of the subsequent uplink transmission can be improved.

In an implementation form of the second aspect, the generated uplink redirection information comprises at least one of: an indication of the identity of the client device, an indication of the detected at least one failed uplink beam, or an identification of the determined at least one new uplink candidate beam. All these elements can be comprised in the generated uplink redirection information either explicitly or implicitly. For example, the identity of the client device can be indicated by either an explicit cell radio network temporary identifier (C-RNTI) or can be derived from the response to the downlink beam failure recovery request that is scrambled by the C-RNTI. The detected at least one failed uplink beam can be indicated either using an explicit bit contained in the uplink redirection information, or implicitly by comparing whether the indicated identification of the determined at least one new uplink candidate beam is the same as or different from the uplink beams that have been used previously. The identification of the determined at least on new uplink candidate beam can be indicated either explicitly by a bit string contained in the generated uplink redirection information, or implicitly by an association to the time-frequency resource location over which the generated response to the downlink beam failure recovery request comprising the generated uplink redirection information is transmitted. This is advantageous as the identity of the client device can help the client device to determine whether the received response to the beam failure recovery request comprising the uplink redirection information is intended to him or another client device. The indication of the detected at least one failed uplink beam can help the client device to derive whether an uplink beam failure occurs and where the subsequent uplink transmission should be redirected to a new uplink beam. The identification of the determined at least one new uplink candidate beam can help the client device to determine how the subsequent uplink transmission can be redirected. Another advantage of this implementation form is that this information allows an agile link management and scheduling and can also be used for interference management in multi-user scenarios.

In an implementation form of the second aspect, the method further comprises transmitting, by the network node device, the generated response via the indicated at least one new downlink candidate beam. This is advantageous as the indicated at least one new downlink candidate beam has been confirmed by the client device to have satisfactory channel quality, and thus it is guaranteed that the generated response can successfully reach the client device.

In an implementation form of the second aspect, the generated response comprises a downlink control information format 0_1. This is advantageous as there is no need to define a new downlink control information format. Specifically, when the new uplink candidate beam is determined based on the reception of sounding reference signal, it can be implicitly carried by the field of sounding reference signal resource indicator in the downlink control information format 0_1. From this field the client device can derive the determined new uplink candidate beam based on the association between the uplink beam used for sounding reference signal transmission and the transmitted sounding reference signal. When the new uplink candidate beam is determined based on the reception of the downlink beam failure recovery request, a certain previously determined information field, e.g., the sounding reference signal resource indicator, can be given a new meaning to carry the index of the PRACH attempt over which the downlink beam failure recovery request is received by the network node device. From this field the client device can derive the determined new uplink candidate beam based on the association between the uplink beam used for PRACH-based downlink beam failure recovery request transmission and the index of the PRACH attempt over which the downlink beam failure recovery request is transmitted. Another advantage of this is that the other field of the downlink control information format 0_1 can be used to carry the necessary parameters required for scheduling the subsequent uplink transmission, such that the subsequent uplink transmission can adapt to the channel quality of the determined new uplink beam.

In an implementation form of the second aspect, the method further comprises receiving, by the network node device, a response to the transmitted uplink redirection information from the client device. This is advantageous as the network node device can make sure that the client device has successfully received the transmitted uplink redirection information and is prepared for redirecting the uplink transmission to the determined at least one new uplink candidate beam.

In an implementation form of the second aspect, the received downlink beam failure recovery request comprises at least one of: an indication of the identity of the client device, or an identification of the determined at least one new downlink candidate beam. This is advantageous as it allows the network node device to receive necessary downlink redirection information to establish the subsequent downlink transmissions.

According to a third aspect, a computer program is provided. The computer program comprises program code configured to perform the method according to the second aspect, when the computer program is executed on a computer.

According to a fourth aspect, a client device is provided. The client device comprises a transceiver. The transceiver is configured to transmit, to a network node device, a generated downlink beam failure recovery request indicating at least one new downlink candidate beam determined to replace at least one failed downlink beam. The transceiver is further configured to receive, from the network node device, a response to the transmitted downlink beam failure recovery request, the response comprising uplink redirection information indicating at least one new uplink candidate beam determined to replace at least one failed uplink beam. This enables a two-way beam failure recovery mechanism e.g. in 5G NR wireless networks to jointly recover the DL and UL beam failures in one BFR procedure which can be done promptly before the radio link failure recovery procedure is trigged. Accordingly, long-lasting link outages can be prevented. Thus, it allows reducing the excessive link outage time and enables 5G applications with more stringent delay requirements such as VR and AR.

In an implementation form of the fourth aspect, the generated downlink beam failure recovery request comprises at least one of: an indication of the identity of the client device, or an identification of the at least one new downlink candidate beam. This is advantageous as by transmitting the generated downlink beam failure recovery request comprising these information, it can provide to the network node device necessary downlink redirection information for the latter to establish the subsequent downlink transmissions.

In an implementation form of the fourth aspect, the received the uplink redirection information comprises at least one of: an indication of the identity of the client device, an indication of a detected at least one failed uplink beam, or an identification of the at least one new uplink candidate beam. All these elements can be comprised in the generated uplink redirection information either explicitly or implicitly. For example, the identity of the client device can be indicated by either an explicit cell radio network temporary identifier (C-RNTI) or can be derived from the response to the downlink beam failure recovery request that is scrambled by the C-RNTI. The detected at least one failed uplink beam can be indicated either using an explicit bit contained in the uplink redirection information, or implicitly by comparing whether the indicated identification of the determined at least one new uplink candidate beam is the same as or different from the uplink beams that have been used previously. The identification of the determined at least on new uplink candidate beam can be indicated either explicitly by a bit string contained in the generated uplink redirection information, or implicitly by an association to the time-frequency resource location over which the generated response to the downlink beam failure recovery request comprising the generated uplink redirection information is transmitted. This is advantageous as the identity of the client device can help the client device to determine whether the received response to the beam failure recovery request comprising the uplink redirection information is intended to him or another client device. The indication of the detected at least one failed uplink beam can help the client device to derive whether an uplink beam failure occurs and where the subsequent uplink transmission should be redirected to a new uplink beam. The identification of the determined at least one new uplink candidate beam can help the client device to determine how the subsequent uplink transmission can be redirected. Another advantage of this implementation form is that this information allows an agile link management and scheduling and can also be used for interference management in multi-user scenarios.

In an implementation form of the fourth aspect, the transceiver is further configured to receive the response via the determined at least one new downlink candidate beam. This is advantageous as the determined at least one new downlink candidate beam has been confirmed by the client device to have satisfactory channel quality, and thus it is guaranteed that the response transmitted by the network node device can successfully reach the client device.

In an implementation form of the fourth aspect, the received response comprises a downlink control information format 0_1. This is advantageous as there is no need to define a new downlink control information format. Specifically, when the new uplink candidate beam is determined based on the reception of sounding reference signal, it can be implicitly carried by the field of sounding reference signal resource indicator in the downlink control information format 0_1. From this field the client device can derive the determined new uplink candidate beam based on the association between the uplink beam used for sounding reference signal transmission and the transmitted sounding reference signal. When the new uplink candidate beam is determined based on the reception of the downlink beam failure recovery request, a certain previously determined information field, e.g., the sounding reference signal resource indicator, can be given a new meaning to carry the index of the PRACH attempt over which the downlink beam failure recovery request is received by the network node device. From this field the client device can derive the determined new uplink candidate beam based on the association between the uplink beam used for PRACH-based downlink beam failure recovery request transmission and the index of the PRACH attempt over which the downlink beam failure recovery request is transmitted. Another advantage of this is that the other field of the downlink control information format 0_1 can be used to carry the necessary parameters required for scheduling the subsequent uplink transmission, such that the subsequent uplink transmission can adapt to the channel quality of the determined new uplink beam.

In an implementation form of the fourth aspect, the client device further comprises a processor configured to configure the client device to use the at least one new downlink candidate beam for a subsequent downlink reception, and to configure the client device to use the at least one new uplink candidate beam for a subsequent uplink transmission. This is advantageous as the failed uplink and downlink beams can be recovered promptly based on the information in the received response.

In an implementation form of the fourth aspect, the processor is further configured to generate a response to the received uplink redirection information, and the transceiver is further configured to transmit the generated response to the network node device. This is advantageous as it enables that the network node device upon receiving this response to the uplink redirection information can make sure that the client device has successfully received the transmitted uplink redirection information and is prepared for redirecting the uplink transmission to the determined at least one new uplink candidate beam.

In an implementation form of the fourth aspect, the transceiver is further configured to transmit the generated response to the received uplink redirection information via the at least one new uplink candidate beam indicated by the received uplink redirection information. This is advantageous as the indicated at least one new uplink candidate beam has been confirmed by the network node device to have satisfactory channel quality, and thus it is guaranteed that the response to the uplink redirection information transmitted by the client device can successfully reach the network node device.

According to a fifth aspect, a method is provided. The method comprises transmitting, to a network node device by a client device, a generated downlink beam failure recovery request indicating at least one new downlink candidate beam determined to replace at least one failed downlink beam. The method further comprises receiving, at the client device from the network node device, a response to the transmitted downlink beam failure recovery request, the response comprising uplink redirection information indicating at least one new uplink candidate beam determined to replace at least one failed uplink beam. This enables a two-way beam failure recovery mechanism that UL and DL beam failure could be recovered simultaneously to reduce the excessive time of link outage.

In an implementation form of the fifth aspect, the generated downlink beam failure recovery request comprises at least one of: an indication of the identity of the client device, or an identification of the at least one new downlink candidate beam. This is advantageous as it allows the network node device to receive necessary downlink redirection information to establish the subsequent downlink transmissions.

In an implementation form of the fifth aspect, the received uplink redirection information comprises at least one of: an indication of the identity of the client device, an indication of a detected at least one failed uplink beam, or an identification of the at least one new uplink candidate beam. All these elements can be comprised in the generated uplink redirection information either explicitly or implicitly. For example, the identity of the client device can be indicated by either an explicit cell radio network temporary identifier (C-RNTI) or can be derived from the response to the downlink beam failure recovery request that is scrambled by the C-RNTI. The detected at least one failed uplink beam can be indicated either using an explicit bit contained in the uplink redirection information, or implicitly by comparing whether the indicated identification of the determined at least one new uplink candidate beam is the same as or different from the uplink beams that have been used previously. The identification of the determined at least on new uplink candidate beam can be indicated either explicitly by a bit string contained in the generated uplink redirection information, or implicitly by an association to the time-frequency resource location over which the generated response to the downlink beam failure recovery request comprising the generated uplink redirection information is transmitted. This is advantageous as the identity of the client device can help the client device to determine whether the received response to the beam failure recovery request comprising the uplink redirection information is intended to him or another client device. The indication of the detected at least one failed uplink beam can help the client device to derive whether an uplink beam failure occurs and where the subsequent uplink transmission should be redirected to a new uplink beam. The identification of the determined at least one new uplink candidate beam can help the client device to determine how the subsequent uplink transmission can be redirected. Another advantage of this implementation form is that this information allows an agile link management and scheduling and can also be used for interference management in multi-user scenarios.

In an implementation form of the fifth aspect, the method further comprises receiving, at the client device, the response via the determined at least one new downlink candidate beam. This is advantageous as the determined at least one new downlink candidate beam has been confirmed by the client device to have satisfactory channel quality, and thus it is guaranteed that the response transmitted by the network node device can successfully reach the client device.

In an implementation form of the fifth aspect, the received response comprises a downlink control information format 0_1. This is advantageous as there is no need to define a new downlink control information format. Specifically, when the new uplink candidate beam is determined based on the reception of sounding reference signal, it can be implicitly carried by the field of sounding reference signal resource indicator in the downlink control information format 0_1. From this field the client device can derive the determined new uplink candidate beam based on the association between the uplink beam used for sounding reference signal transmission and the transmitted sounding reference signal. When the new uplink candidate beam is determined based on the reception of the downlink beam failure recovery request, a certain previously determined information field, e.g., the sounding reference signal resource indicator, can be given a new meaning to carry the index of the PRACH attempt over which the downlink beam failure recovery request is received by the network node device. From this field the client device can derive the determined new uplink candidate beam based on the association between the uplink beam used for PRACH-based downlink beam failure recovery request transmission and the index of the PRACH attempt over which the downlink beam failure recovery request is transmitted. Another advantage of this is that the other field of the downlink control information format 0_1 can be used to carry the necessary parameters required for scheduling the subsequent uplink transmission, such that the subsequent uplink transmission can adapt to the channel quality of the determined new uplink beam.

In an implementation form of the fifth aspect, the method further comprises configuring the client device to use the at least one new downlink candidate beam for a subsequent downlink reception, and configuring the client device to use the at least one new uplink candidate beam for a subsequent uplink transmission. This is advantageous as the failed uplink and downlink beams can be recovered promptly based on the information in the received response.

In an implementation form of the fifth aspect, the method further comprises generating, by the client device, a response to the received uplink redirection information, and transmitting the generated response to the network node device. This is advantageous as it enables that the network node device upon receiving this response to the uplink redirection information can make sure that the client device has successfully received the transmitted uplink redirection information and is prepared for redirecting the uplink transmission to the determined at least one new uplink candidate beam.

In an implementation form of the fifth aspect, the method further comprises transmitting, by the client device, the generated response to the received uplink redirection information via the at least one new uplink candidate beam indicated by the received uplink redirection information. This is advantageous as the indicated at least one new uplink candidate beam has been confirmed by the network node device to have satisfactory channel quality, and thus it is guaranteed that the response to the uplink redirection information transmitted by the client device can successfully reach the network node device.

According to a sixth aspect, a computer program is provided. The computer program comprises program code configured to perform the method according to the fifth aspect, when the computer program is executed on a computer.

According to a seventh aspect, a network node device is provided. The network node device comprises a transceiver and a processor. The processor is configured to detect at least one failed uplink beam. The processor is further configured to determine at least one new uplink candidate beam to replace the detected at least one failed uplink beam. The processor is further configured to generate uplink redirection information. The uplink redirection information indicates the determined at least one new uplink candidate beam. The transceiver is further configured to transmit the generated uplink redirection information to a client device. The disclosure allows the network node device to recover a detected uplink beam failure without the presence of downlink beam failure e.g. in 5G NR wireless networks.

In an implementation form of the seventh aspect, the transceiver is further configured to transmit the generated uplink redirection information via a physical downlink control channel. This is advantageous as the physical downlink control channel may has been established. Provided that this physical downlink channel does not fail, the generated uplink redirection information can successfully reach the client device.

In an implementation form of the seventh aspect, the generated uplink redirection information comprises at least one of: an indication of the identity of the client device, an indication of the detected at least one failed uplink beam, or an identification of the determined at least one new uplink candidate beam. This is advantageous at it provide necessary information for the client device to recover the uplink beam failure and reestablish the uplink transmission.

In an implementation form of the seventh aspect, the generated response comprises a downlink control information format 0_1. This is advantageous as there is no need to define a new downlink control information format. Specifically, the new uplink candidate beam determined based on the reception of sounding reference signal can be implicitly carried by the field of sounding reference signal resource indicator in the downlink control information format 0_1. From this field the client device can derive the determined new uplink candidate beam based on the association between the uplink beam used for sounding reference signal transmission and the transmitted sounding reference signal. Another advantage of this is that the other field of the downlink control information format 0_1 can be used to carry the necessary parameters required for scheduling the subsequent uplink transmission, such that the subsequent uplink transmission can adapt to the channel quality of the determined new uplink beam.

In an implementation form of the seventh aspect, the transceiver is further configured to receive a response to the transmitted uplink redirection information from the client device. This is advantageous as the network node device can make sure that the client device has successfully received the transmitted uplink redirection information and is prepared for redirecting the uplink transmission to the determined at least one new uplink candidate beam.

In an implementation form of the seventh aspect, the response to the transmitted uplink redirection information from the client device is received via the determined at least one of the uplink new candidate beam. This is advantageous as the determined at least one of the uplink new candidate beam has been confirmed by the network node device to have satisfactory channel quality and thus it is guaranteed that the response to the transmitted uplink redirection can successfully reach the network node device.

According to an eighth aspect, a method is provided. The method comprises detecting, by a network node device, at least one failed uplink beam. The method further comprises determining, by the network node device, at least one new uplink candidate beam to replace the detected at least one failed uplink beam. The method further comprises generating, by the network node device, uplink redirection information. The uplink redirection information indicates the determined at least one new uplink candidate beam. The method further comprises transmitting, by the network node device, the generated uplink redirection information to a client device. The disclosure allows the network node device to recover a detected uplink beam failure without the presence of downlink beam failure e.g. in 5G NR wireless networks.

In an implementation form of the eighth aspect, the method further comprises transmitting, by the network node device, the generated uplink redirection information via a physical downlink control channel. This is advantageous as a physical downlink control channel may have been established. Provided that this physical downlink channel does not fail, the generated uplink redirection information can successfully reach the client device.

In an implementation form of the eighth aspect, the generated uplink redirection information comprises at least one of: an indication of the identity of the client device, an indication of the detected at least one failed uplink beam, or an identification of the determined at least one new uplink candidate beam. This is advantageous at it provide necessary information for the client device to recover the uplink beam failure and reestablish the uplink transmission.

In an implementation form of the eighth aspect, the generated response comprises a downlink control information format 0_1. This is advantageous as there is no need to define a new downlink control information format. Specifically, the new uplink candidate beam determined based on the reception of sounding reference signal can be implicitly carried by the field of sounding reference signal resource indicator in the downlink control information format 0_1. From this field the client device can derive the determined new uplink candidate beam based on the association between the uplink beam used for sounding reference signal transmission and the transmitted sounding reference signal. Another advantage of this is that the other field of the downlink control information format 0_1 can be used to carry the necessary parameters required for scheduling the subsequent uplink transmission, such that the subsequent uplink transmission can adapt to the channel quality of the determined new uplink beam.

In an implementation form of the eighth aspect, the method further comprises receiving, by the network node device, a response to the transmitted uplink redirection information from the client device. This is advantageous as the network node device can make sure that the client device has successfully received the transmitted uplink redirection information and is prepared for redirecting the uplink transmission to the determined at least one new uplink candidate beam.

In an implementation form of the eighth aspect, the response to the transmitted uplink redirection information from the client device is received via the determined at least one of the uplink new candidate beam. This is advantageous as the determined at least one of the uplink new candidate beam has been confirmed by the network node device to have satisfactory channel quality and thus it is guaranteed that the response to the transmitted uplink redirection can successfully reach the network node device.

According to a ninth aspect, a computer program is provided. The computer program comprises program code configured to perform the method according to the eighth aspect, when the computer program is executed on a computer.

According to a tenth aspect, a client device is provided. The client device comprises a transceiver. The transceiver is configured to receive, from a network node device, uplink redirection information indicating at least one new uplink candidate beam determined to replace at least one failed uplink beam. This enable the client device to be aware of the uplink beam failure and be prepared to reestablish the subsequent uplink transmission.

In an implementation form of the tenth aspect, the received the uplink redirection information comprises at least one of: an indication of the identity of the client device, an indication of a detected at least one failed uplink beam, or an identification of the at least one new uplink candidate beam. This is advantageous at it provide necessary information for the client device to recover the uplink beam failure and reestablish the uplink transmission.

In an implementation form of the tenth aspect, the transceiver is further configured to receive the uplink redirection information via a physical downlink control channel. This is advantageous as a physical downlink control channel may have been established. Provided that this physical downlink channel does not fail, the generated uplink redirection information can successfully reach the client device.

In an implementation form of the tenth aspect, the received uplink redirection information comprises a downlink control information format 0_1. This is advantageous as there is no need to define a new downlink control information format. Specifically, the new uplink candidate beam determined based on the reception of sounding reference signal can be implicitly carried by the field of sounding reference signal resource indicator in the downlink control information format 0_1. From this field the client device can derive the determined new uplink candidate beam based on the association between the uplink beam used for sounding reference signal transmission and the transmitted sounding reference signal. Another advantage of this is that the other field of the downlink control information format 0_1 can be used to carry the necessary parameters required for scheduling the subsequent uplink transmission, such that the subsequent uplink transmission can adapt to the channel quality of the determined new uplink beam.

In an implementation form of the tenth aspect, the processor is further configured to generate a response to the received uplink redirection information, and the transceiver is further configured to transmit the generated response to the network node device. This is advantageous as it enables that the network node device upon receiving this response to the uplink redirection information can make sure that the client device has successfully received the transmitted uplink redirection information and is prepared for redirecting the uplink transmission to the determined at least one new uplink candidate beam.

In an implementation form of the tenth aspect, the transceiver is further configured to transmit the generated response to the received uplink redirection information via the at least one new uplink candidate beam indicated by the received uplink redirection information. This is advantageous as the indicated at least one new uplink candidate beam has been confirmed by the network node device to have satisfactory channel quality, and thus it is guaranteed that the response to the uplink redirection information transmitted by the client device can successfully reach the network node device.

In an implementation form of the tenth aspect, the client device further comprises a processor configured to configure the client device to use the at least one new uplink candidate beam for a subsequent uplink transmission. This is advantageous as the failed uplink beams can be recovered promptly based on the received uplink redirection information.

According to an eleventh aspect, a method is provided. The method comprises receiving, at a client device from a network node device, uplink redirection information indicating at least one new uplink candidate beam determined to replace at least one failed uplink beam. This enable the client device to be aware of the uplink beam failure and be prepared to reestablish the subsequent uplink transmission.

In an implementation form of the eleventh aspect, the received the uplink redirection information comprises at least one of: an indication of the identity of the client device, an indication of a detected at least one failed uplink beam, or an identification of the at least one new uplink candidate beam. This is advantageous at it provide necessary information for the client device to recover the uplink beam failure and reestablish the uplink transmission.

In an implementation form of the eleventh aspect, method further comprises receiving, by the client device, the uplink redirection information via a physical downlink control channel. This is advantageous as a physical downlink control channel may have been established. Provided that this physical downlink channel does not fail, the generated uplink redirection information can successfully reach the client device.

In an implementation form of the eleventh aspect, the received uplink redirection information comprises a downlink control information format 0_1. This is advantageous as there is no need to define a new downlink control information format. Specifically, the new uplink candidate beam determined based on the reception of sounding reference signal can be implicitly carried by the field of sounding reference signal resource indicator in the downlink control information format 0_1. From this field the client device can derive the determined new uplink candidate beam based on the association between the uplink beam used for sounding reference signal transmission and the transmitted sounding reference signal. Another advantage of this is that the other field of the downlink control information format 0_1 can be used to carry the necessary parameters required for scheduling the subsequent uplink transmission, such that the subsequent uplink transmission can adapt to the channel quality of the determined new uplink beam.

In an implementation form of the eleventh aspect, method further comprises generating, by the client device, a response to the received uplink redirection information, and transmitting the generated response to the network node device. This is advantageous as it enables that the network node device upon receiving this response to the uplink redirection information can make sure that the client device has successfully received the transmitted uplink redirection information and is prepared for redirecting the uplink transmission to the determined at least one new uplink candidate beam.

In an implementation form of the eleventh aspect, method further comprises transmitting, by the client device, the generated response to the received uplink redirection information via the at least one new uplink candidate beam indicated by the received uplink redirection information. This is advantageous as the indicated at least one new uplink candidate beam has been confirmed by the network node device to have satisfactory channel quality, and thus it is guaranteed that the response to the uplink redirection information transmitted by the client device can successfully reach the network node device.

In an implementation form of the eleventh aspect, method further comprises configuring the client device to use the at least one new uplink candidate beam for a subsequent uplink transmission. This is advantageous as the failed uplink beams can be recovered promptly based on the received uplink redirection information.

According to a twelfth aspect, a computer program is provided. The computer program comprises program code configured to perform the method according to the eleventh aspect, when the computer program is executed on a computer.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

Figure 1A:
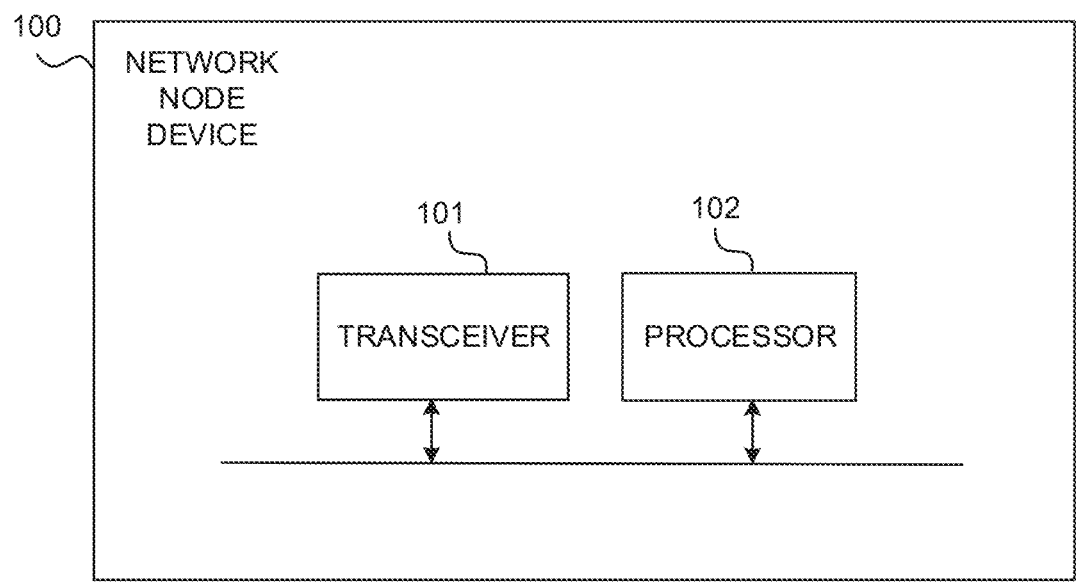
FIG. 1A is a block diagram illustrating a network node device.

In the following, identical reference signs refer to identical or at least functionally equivalent features.

DETAILED DESCRIPTION

In the following description, reference is made to the accompanying drawings, which form part of the disclosure, and in which are shown, by way of illustration, specific aspects in which the disclosure may be placed. It is understood that other aspects may be utilized and structural or logical changes may be made without departing from the scope of the disclosure. The following detailed description, therefore, is not to be taken in a limiting sense, as the scope of the disclosure is defined in the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

The disclosure allows recovering both UL and DL beam failures using a joint BFR mechanism in wireless communication networks, thus enabling a two-way beam failure recovery mechanism in order to avoid unnecessary link outage, e.g. in 5G NR systems. That is, the disclosure reduces the excessive delay of BFR and enables 5G applications with stringent latency requirements.

In other words, the disclosure allows simultaneous UL and DL beam failure recoveries (BFR) when both UL and DL beams are obstructed at the same time, which differs from prior art in which UL BFR can be performed only after the DL BFR has been finished successfully. Differences between the disclosure and prior art include:

a) the network node device is able to identify a new candidate UL beam by utilizing the reception of a BFR request from the UE besides the reception of a sounding reference signal from the UE; and b) the UL redirection information from the network node device is included in the network node device response to the BFR request, such that the UE can derive both the successful DL BFR and the UL redirection information from the reception of the network node device response simultaneously.

In the following, an example of 5G NR mmWave communication network 200 is provided based on FIG. 2. In this network 200, there is at least one client device 110 (or user node such as UE) and at least one network node device 100 (e.g. a base station or gNB). The UE 110 has established a communication link with the gNB 100. This communication link comprises an UL connection and a DL connection. Both the UL and DL connections may contain one or more Beam Pair Links (BPLs), and the BPLs for UL and DL connections can either be the same or different. In this disclosure, the terms of beam and BPL can refer to the same thing and will be used alternatively.

It is to be noted that the UL-DL beam correspondence even in Time-Division Duplex (TDD) may not hold since the transmit and receive antennas at the nodes may be different. Even if the UL-DL beam correspondence holds, it is still possible that the system selects different sets of BPLs for UL and DL transmission/reception, as the transmission power, noise figure and interference of the gNB 100 and UE 110 may be different, leading to different UL/DL SINR values for a BPL. This also enables flexibility in beam selection by which the interferences among selected beams can be managed in multi-user and multi-cell scenarios.

Figure 2:
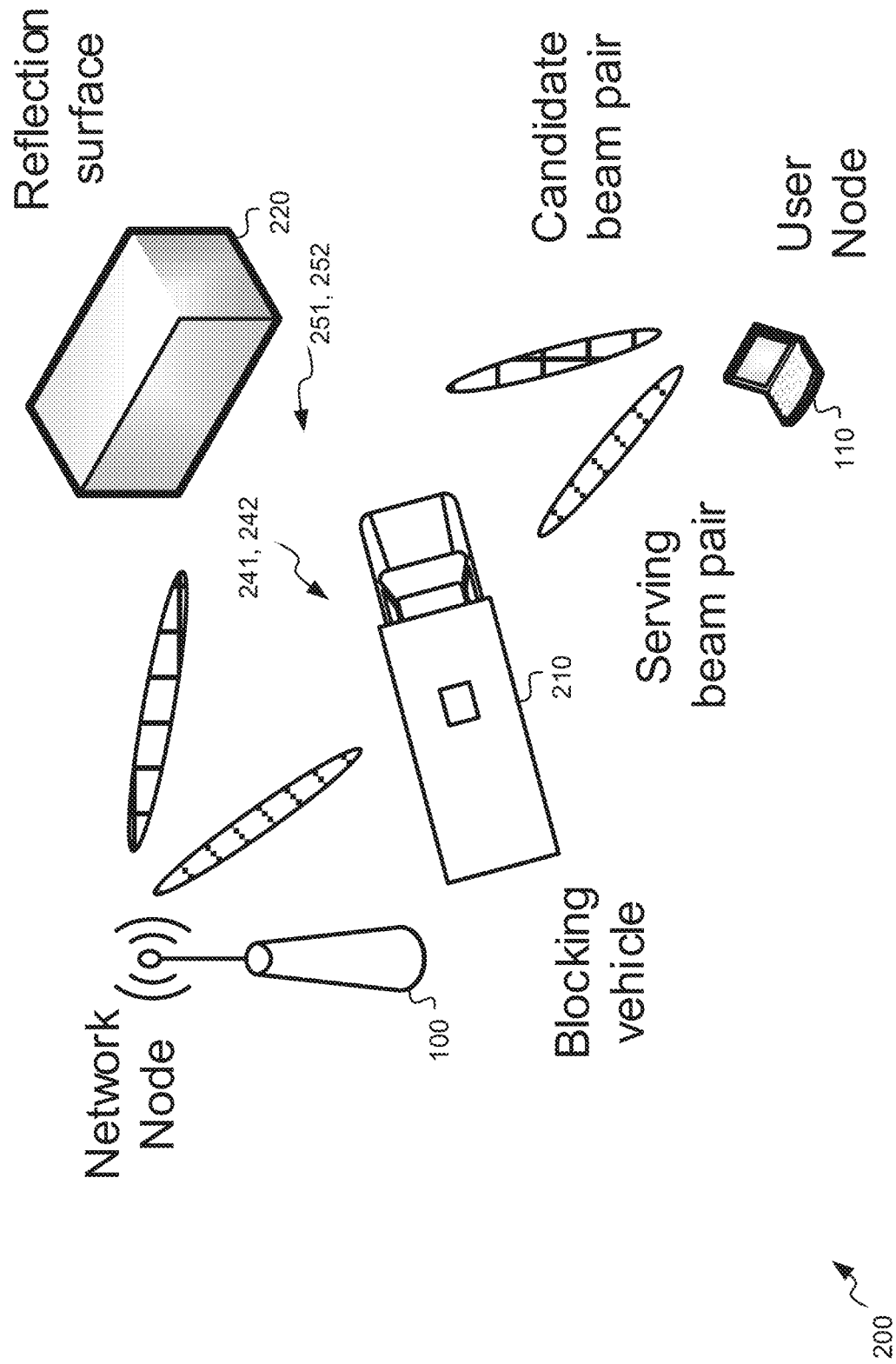
FIG. 2 is a diagram illustrating a system.

During the communication between the UE 110 and gNB 100, the communication link may be interrupted by e.g. beam misalignment caused by UE movement or blockage caused by an object (e.g. a moving vehicle 210 shown in FIG. 2). This link interruption may affect only the UL connection, only the DL connection, or both at the same time. Therefore, there are three different scenarios for the beam failure events:

failure of only DL beam 241;
failure of only UL beam 242;
failure of both UL beam 242 and DL beam 241.

To facilitate the UE 110 to detect and recover from a potential DL beam failure, the gNB 100 may periodically transmit a set of reference signals (RSs) for DL beam failure detection, and a set of reference signals for identification of a new candidate DL beam 251 (e.g. via a reflecting surface 220). For example, the RSs for DL beam failure detection can include a periodic Channel State Information RS (CSI-RS) and/or a Synchronization Signal (SS) block that are spatially Quasi-Collocated (QCL'ed) with the Physical Downlink Control Channel (PDCCH) Demodulation RS (DMRS). Alternatively/additionally, the RSs for the new candidate DL beam identification can include at least one periodic CSI-RS and/or SS block, which may be the same or different from the RS for DL beam failure detection.

Similarly, the UE 110 may also periodically transmit a set of RSs for UL beam failure detection and a set of RSs for identification of a new candidate UL beam 252. For example, the RSs for UL beam failure detection can include periodic sounding RSs (SRSs) that are spatially QCL'ed with the Physical Uplink Control Channel (PUCCH) DMRS. The RSs for the new candidate UL beam identification can also include SRSs, which may be the same or different from the RSs for the UL beam failure detection. Alternatively/additionally, the RSs for the new candidate UL beam identification can include Physical Random Access Channel (PRACH) preambles used for DL BFR request transmission. It is to be noted that the BFR request transmission via PRACH may be transmitted using power different from that used for the transmission of the other RSs for the new candidate UL beam identification, e.g., SRSs. The threshold used for identifying a new candidate UL beam via PRACH preamble may be linearly scaled from that used for identifying a new candidate UL beam via other RSs for the new candidate UL beam identification.

In the following, two-way BFR consisting of both UL and DL BFRs is discussed. That is, in addition to the DL BFR that is initiated from UE side, the disclosure allows the recovery of UL beam failure either in presence of DL beam failure or without DL beam failure. The gNB 100 as the UL receiver first detects the potential UL beam failure and then identifies new UL candidate beams. Then, the gNB 100 indicates to the UE 110 the UL redirection information including the UL beam failure event and the selected new UL candidate beams, by which the UE 110 can switch the UL transmission to the new UL transmission beam directions. When the gNB 100 also receives the BFR request from UE 110, this UL redirection information can be contained in the gNB response to be transmitted to the UE. The new UL beam indices may be transmitted implicitly or explicitly. As discussed below, one way to convey the UL beam indices to the UE 110 is to use Downlink Control Information (DCI) format 0_1.

Figure 1B:
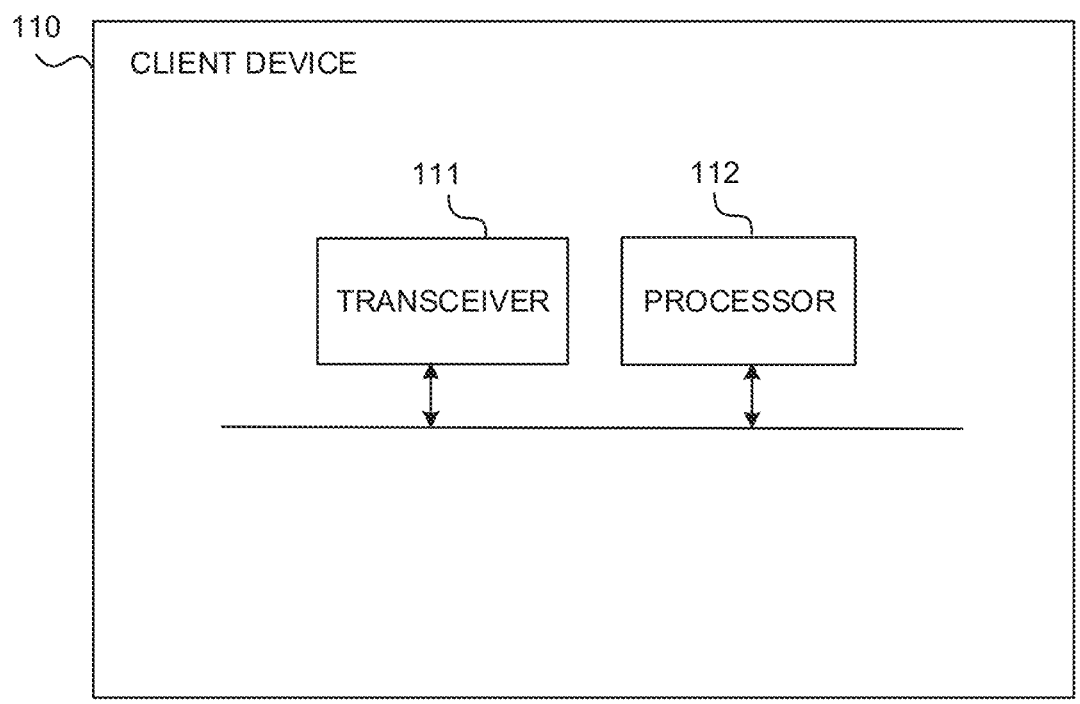
FIG. 1B is a block diagram illustrating a client device.

Next, example embodiments of network node device 100 and client device 110 are described based on FIGS. 1A and 1B. Some of the features of the described devices are optional features which provide further advantages.

FIG. 1A is a block diagram that illustrates a network node device 100. The network node device 100 may include e.g. a base station, such as a macro-eNodeB, a pico-eNodeB, a home eNodeB, a fifth-generation base station (gNB) or any such device providing an air interface for client devices (including e.g. the client device 110 of FIG. 1B) to connect to the wireless network via wireless transmissions.

According to an aspect, the network node device 100 comprises a transceiver 101 and a processor or a processing unit 102 coupled to the transceiver 101, which may be used to implement the functionalities described later in more detail.

The processor 102 may include e.g. one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The network node device 100 may further comprise a memory (not illustrated in FIG. 1A) that is configured to store e.g. computer programs and the like. The memory may include one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

The transceiver 101 is configured to receive a downlink beam failure recovery request from a client device (such as client device 110 of FIG. 1B). The downlink beam failure recovery request indicates at least one new downlink candidate beam that has been determined to replace at least one failed downlink beam. In an example, the received downlink beam failure recovery request may comprise an indication of the identity of the client device, and/or an identification of the determined at least one new downlink candidate beam.

The processor 102 is configured to detect at least one failed uplink beam.

The processor 102 is further configured to determine at least one new uplink candidate beam to replace the detected at least one failed uplink beam. In an example, the processor 102 may determine the at least one new uplink candidate beam based on the reception of the downlink beam failure recovery request from the client device.

For example, the determination of the at least one new uplink candidate beam based on the reception of the downlink beam failure recovery request may comprise the processor 102 determining the at least one new uplink candidate beam based on a time and frequency location of the received downlink beam failure recovery request.

Alternatively/additionally, the determination of the at least one new uplink candidate beam based on the reception of the downlink beam failure recovery request may comprise the processor 102 determining the at least one new uplink candidate beam based on a preamble in the received downlink beam failure recovery request.

Alternatively/additionally, the determination of the at least one new uplink candidate beam based on the reception of the downlink beam failure recovery request may comprise the processor 102 determining the at least one new uplink candidate beam based on the combination of a preamble in the received downlink beam failure recovery request and a time and frequency location of the received downlink beam failure recovery request.

In other words, the downlink beam failure recovery request is transmitted one or multiple times using one or multiple preambles (i.e. sequences) over one or multiple predefined time-frequency locations. Hence, the index of the preamble, or the time-frequency location, or their combination may be used to carry information about the uplink beam used for transmit each copy of the downlink beam failure recovery request since there can be an association between them.

Alternatively, the determination of the at least one new uplink candidate beam may comprise the processor 102 determining the at least one new uplink candidate beam based on a sounding reference signal received from the client device 110. As is known the art, a sounding reference signal (SRS) is a reference signal transmitted by an UE in the uplink direction which is used by a network node (e.g. base station) to estimate the uplink channel quality over different frequency and/or directions. Typically, the network node may use this information e.g. to sense the uplink channel quality for uplink channel scheduling and/or uplink beam failure recovery.

In other words, for the network node device 100 to determine a new uplink candidate beam, the UE 110 needs to transmit some signals associated with different uplink beams (referred to as new uplink candidate beam identification reference signals), such that upon successfully receiving one such signal the network node device 100 can determine that the associated uplink beam is suitable to be selected for replacing the failed uplink beam.

The disclosure allows using the downlink beam failure recovery request as uplink candidate beam identification reference signals. This is because the downlink beam failure recovery request will be transmitted one or multiple times in a random-access manner and is also associated with different uplink beams. Hence, upon receiving one copy of the downlink beam failure recovery request, the network node device 100 can also determine that the associated uplink beam is suitable to be selected for replacing the failed uplink beam.

Accordingly, the disclosure provides more reference signals for new uplink candidate beam identification, and thus allows determining a new uplink beam with a higher probability, lower latency/overhead, and better channel quality than previously.

The processor 102 is further configured to generate uplink redirection information. The uplink redirection information indicates the determined at least one new uplink candidate beam. In an example, the generated uplink redirection information may comprise an indication of the identity of the client device, an indication of the detected at least one failed uplink beam, and/or an identification of the determined at least one new uplink candidate beam.

The processor 102 is further configured to generate a response comprising the generated uplink redirection information. The response should be prepared in such a way that the client device can a) confirm the successful reception of BFR request by the gNB, b) whether there is an uplink beam failure, c) realize whether a new UL beam is associated to SRS or to PRACH attempt index BFR request transmission, and d) determine the new UL beam from the associated SRS index or the PRACH attempt index for BFR request transmission. In an example, the generated response may comprise a downlink control information (DCI) format 0_1. New Radio defines several DCI formats for a control signal to be transmitted on a physical downlink channel. Each DCI format defines the size and format of the control signal, such as the position and meaning of each bit in the control signal. In DCI format 0_1, there are several bits defined for SRS resource indicator. Therefore, if the network node device 100 identifies a new UL beam based on the SRS reception, the network node device 100 can indicate this UL beam index to the UE 110 e.g. via indicating the index of the received SRS in the SRS resource indicator. If the network node device 100 identifies a new UL beam based on the request reception, the network node device 100 can indicate this UL beam index to the UE 100 e.g. by reusing the field of the SRS resource indicator to indicate the index of PRACH attempt over which the BFR request is received.

The transceiver 101 is further configured to transmit the generated response to the client device 110. Based on the association between the SRS/PRACH attempt index and the index of the UL beam used to transmit the corresponding SRS/BFR request, the UE can derive a new uplink candidate beam from the received SRS/PRACH attempt index.

In an example, the transceiver 101 is further configured to transmit the generated response to the client device 110 via the at least one new downlink candidate beam (i.e. a beam pair which includes a DL transmit beam used at the network node device 100 and a DL receive beam used at the client device 110) indicated by the downlink beam failure recovery request received from the client device 110.

Optionally, the transceiver 101 may be further configured to receive a response to the transmitted uplink redirection information from the client device 110.

FIG. 1B is a block diagram that illustrates a client device 110. The client device 110 may be any of various types of devices used directly by an end user entity and capable of communication in a wireless network, such as user equipment (UE). Such devices include but are not limited to smartphones, tablet computers, smart watches, lap top computers, Internet-of-Things (IoT) devices etc. Although embodiments may be described in terms of a client device, it is by way of example and in no way a limitation.

According to an aspect, the client device 110 may comprise a transceiver 111 and a processor or a processing unit 112 coupled to the transceiver 111, which may be used to implement the functionalities described below in more detail.

The processor 112 may include e.g. one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The client device 110 may further comprise a memory (not illustrated in FIG. 1B) that is configured to store e.g. computer programs and the like. The memory may include one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

It is to be noted that the various parameters and pieces of data used by the client device 110 are identical or at least functionally equivalent to those used by the network node device 100 so their descriptions are not repeated here in detail.

The transceiver 111 is configured to transmit, to a network node device (such as network node device 100 of FIG. 1A), a generated downlink beam failure recovery request that indicates at least one new downlink candidate beam determined to replace at least one failed downlink beam. In an example, the generated downlink beam failure recovery request may comprise an indication of the identity of the client device, and/or an identification of the at least one new downlink candidate beam.

The transceiver 111 is further configured to receive, from the network node device 100, a response to the transmitted downlink beam failure recovery request. In an example, the transceiver 111 may be further configured to receive the response via the at least one new downlink candidate beam indicated in the downlink beam failure recovery request transmitted to the network node device 100. The response comprises uplink redirection information indicating at least one new uplink candidate beam determined by the network node device 100 to replace at least one failed uplink beam. In an example, the received the uplink redirection information may comprise an indication of the identity of the client device, an indication of a detected at least one failed uplink beam, and/or an identification of the at least one new uplink candidate beam. In an example, the received response may comprise a downlink control information (DCI) format 0_1.

The processor 112 may be configured to configure the client device 110 to use the at least one new downlink candidate beam for a subsequent downlink reception, and/or to configure the client device 110 to use the at least one new uplink candidate beam for a subsequent uplink transmission.

The processor 112 may be further configured to generate a response to the received uplink redirection information, and the transceiver 111 may be further configured to transmit the generated response to the network node device 100. The transceiver 111 may be further configured to transmit the generated response to the received uplink redirection information via the at least one new uplink candidate beam indicated by the uplink redirection information.

In other words, in a first embodiment of the disclosure (also illustrated in FIG. 3A), the network node device 100 detects the UL beam failure by monitoring the RS for UL beam failure detection, and in the meanwhile, it also receives the BFR request from UE via monitoring the resource dedicated for BFR request reception. Based on the received BFR request from the UE 110, the network node device 100 can derive the event of DL beam failure and the new DL TX beam index. In addition, the network node device 100 can identify a new UL candidate beam based on the RS for UL new candidate beam identification, which could be either the SRS or the PRACH preambles used for BFR request transmission. It is to be noted that in this case, the network node device 100 can always identify a new UL candidate beam since the successful reception of the BFR request already indicates the existence of at least one satisfactory UL BPL.

The network node device 100 can be configured to determine one or more quality measurements for a beam pair link to be performed on the set of RSs for UL beam failure detection and on the set of RSs for UL new candidate beam identification. These quality measurements may be related to e.g. received power (i.e. L1-RSRP), channel quality index, signal-to-noise ratio (SNR), signal-to-interference-plus-noise ratio (SINR), and/or block error rate (BLER). The detection of beam failure and the identification of a new candidate beam may be based e.g. on the comparison of the quality measurement for a beam pair link against a given threshold value. The quality measurements and the threshold used for beam failure detection and UL new candidate beam identification can either be the same or different.

Since the network node device 100 has received the DL BFR request from the UE 110, for the purposes of DL beam failure recovery the next step for the network node device 100 is to send the network node device response to the UE 110 such that the UE upon receiving this response can confirm that the DL BFR is successful. In the meanwhile, the network node device 100 may also include in the network node device response the UL redirection information including the UE identity, the event of UL beam failure and/or the new UL TX beam index. This information can be indicated either explicitly or implicitly, and it is used by the UE to switch the UL transmission to the new UL TX beam. When the network node device response is transmitted using a given DCI format, the selected DCI format needs to enable the indication of UL TX beam index. For example, the DCI format 0_1 (usually used for the scheduling of Physical Uplink Shared Channel (PUSCH)) can be used.

After transmitting the request to the network node device 100, the UE 110 is expected to monitor the dedicated CORESET for the reception of the network node device response to the transmitted BFR request. After receiving the network node device response, the UE can not only confirm the successful DL BFR but also derive the new UL TX beam index and switch the UL transmission to the new UL beam direction. An UE response can be transmitted to the network node device 100 via the new UL TX beam. Upon receiving this UE response, the network node device 100 can then declare successful UL BFR.

It is to be noted that this first embodiment applies to both the scenarios with and without beam correspondence, and the above discussions generally assume there is no beam correspondence. When the beam correspondence holds in the system, the UE is able to derive one or multiple feasible UL BPLs based on the identified new candidate DL BPLs. In this case, the UE does not need to transmit the BFR request by trying all the spatial directions, but only transmit it via the derived feasible UL BPLs. Similarly, the network node device 100 may also be able to derive one or multiple feasible DL BPLs based on the identified new candidate UL BPLs. However, the network node device 100 still needs to transmit the UL redirection information via the network node device response through the new candidate DL BPL reported by the UE 110 in the BFR request. This is because after transmitting the BFR request the UE 110 is only expected to receive the network node device response through the reported new candidate DL BPL, and it is not prepared to receive the network node device response in other spatial directions.

In a second embodiment of the disclosure (also illustrated in FIGS. 3B and 3C), the network node device 100 detects the UL beam failure by monitoring the RS for UL beam failure detection but does not receive the BFR request from the UE 110. This may happen for several reasons. One possibility is that the DL beam does not fail (as illustrated in FIG. 3B) and so the UE 110 does not need to transmit the BFR request. Another possibility is that the UE 110 detects the DL beam failure but fails to identify a new candidate DL beam, or the BFR request fails to reach the network node device 100 during the PUCCH/PRACH transmission (as illustrated in FIG. 3C). With any of these possibilities, the network node device 100 always tries to identify a new candidate UL beam by monitoring the RS for new candidate UL beam identification (e.g., SRS).

When the network node device 100 fails to identify a new candidate UL beam, it can prepare to transmit a negative acknowledgement (NACK) signal with which the UE 110 can derive the UL beam failure and in turn trigger the radio link failure recovery when necessary. When the network node device 100 successfully identifies a new candidate UL beam, it then transmits UL redirection information to the UE 110 via an existing PDCCH. This UL redirection information may include at least one of the UE identity, the event of UL beam failure or the new UL TX beam index. The UL redirection information can be carried in the existing PDCCH either explicitly or implicitly. For example, the UL redirection information can be transmitted using a given DCI format and the selected DCI format (e.g. DCI format 0_1) may enable the indication of the new UL beam index.

It is to be noted that in this case the network node device 100 does not know whether the existing PDCCH has failed or not, but this existing PDCCH is the only DL connection to the UE 110 that the network node device 100 is aware of. So, after transmitting the UL redirection information the network node device 100 may monitor the UL control channel for an UE response reception. The monitored UL control channel may be the NR PUCCH whose DMRS is spatial QCL'ed with the RS of the new candidate UL beam identified by the network node device 100. Upon receiving the UE response, the network node device 100 can then declare successful UL BFR. Otherwise, if the network node device 100 fails to receive the UE response within a certain time window, it implies that the UE detects DL beam failure but is unable to recover from it. In such a case, the network node device 100 expects that the UE 110 will declare the failure of DL BFR and possibly trigger the radio link failure recovery.

It is to be noted that this second embodiment also applies to both the scenarios with and without beam correspondence, and the above discussion generally assumes there is no beam correspondence. Since the network node device 100 does not receive the BFR request from the UE 110, it is unaware of what is happening at the UE side, e.g. that there is no DL beam failure, or there is DL beam failure but the UE 110 is unable to recover it. Hence, even if there is beam correspondence, the network node device 100 still transmits the UL redirection information through the existing PDCCH.

Figure 3A:
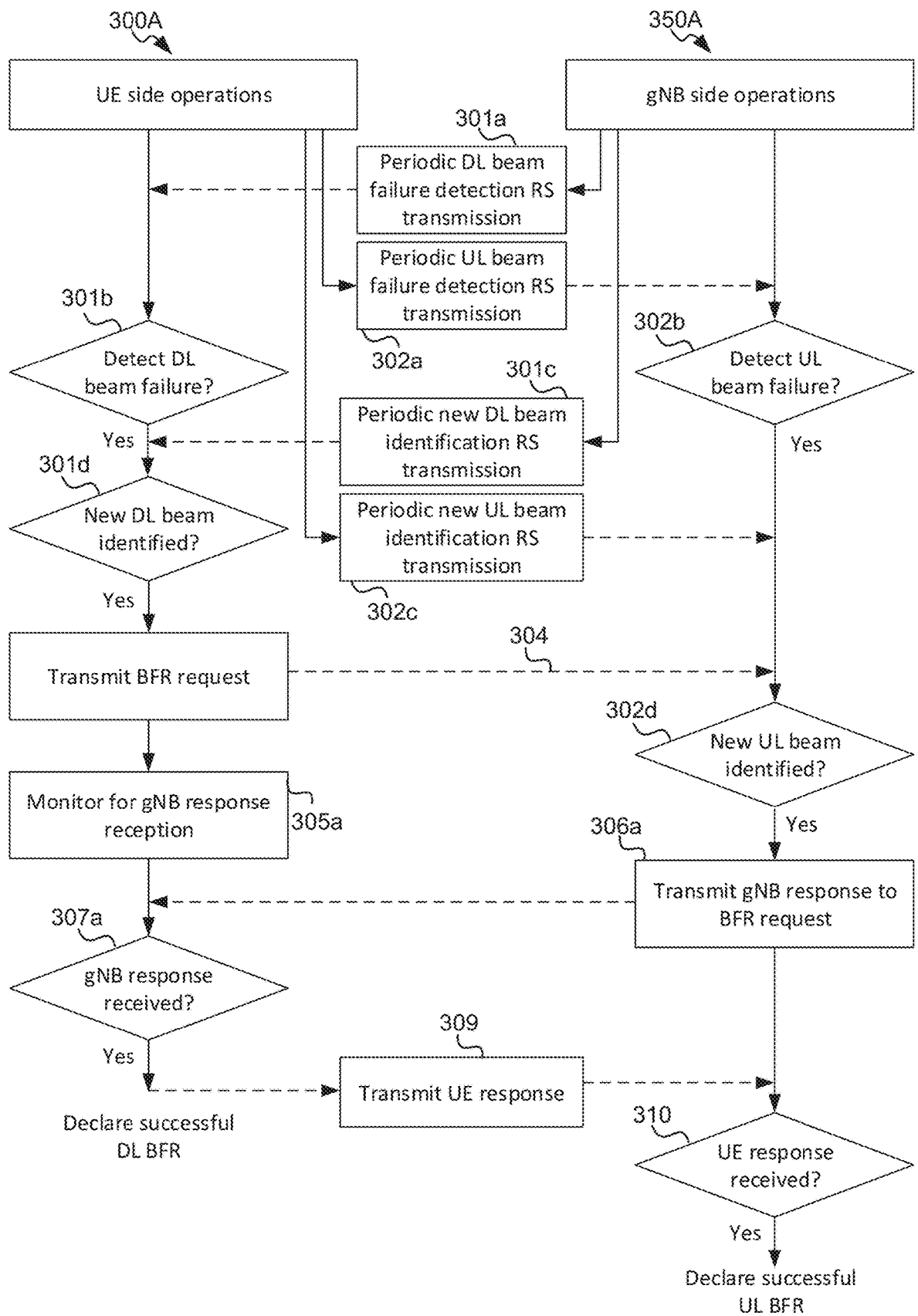
FIG. 3A is a flow diagram illustrating a method.
Figure 3B:
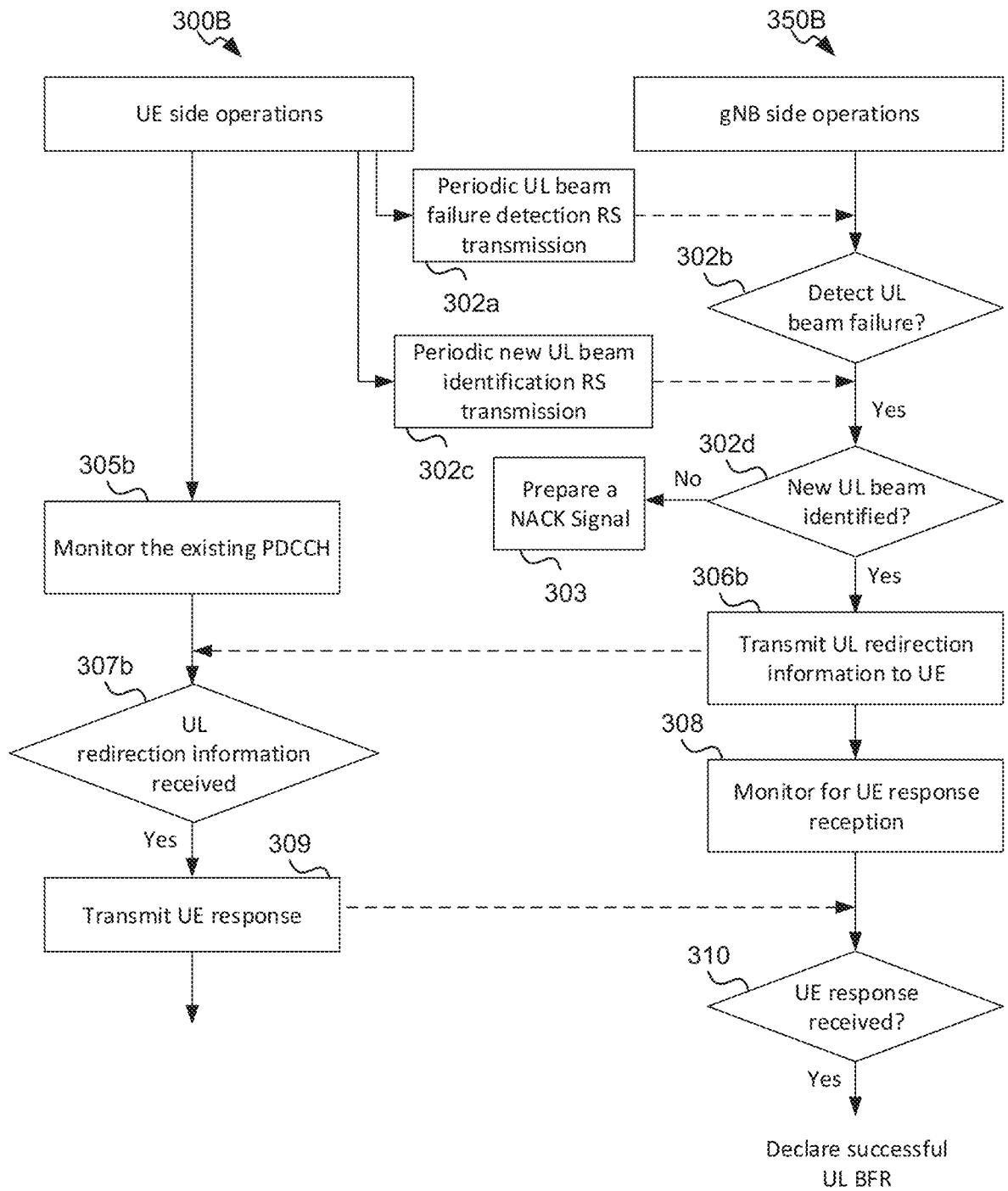
FIG. 3B is another flow diagram illustrating a method.
Figure 3C:
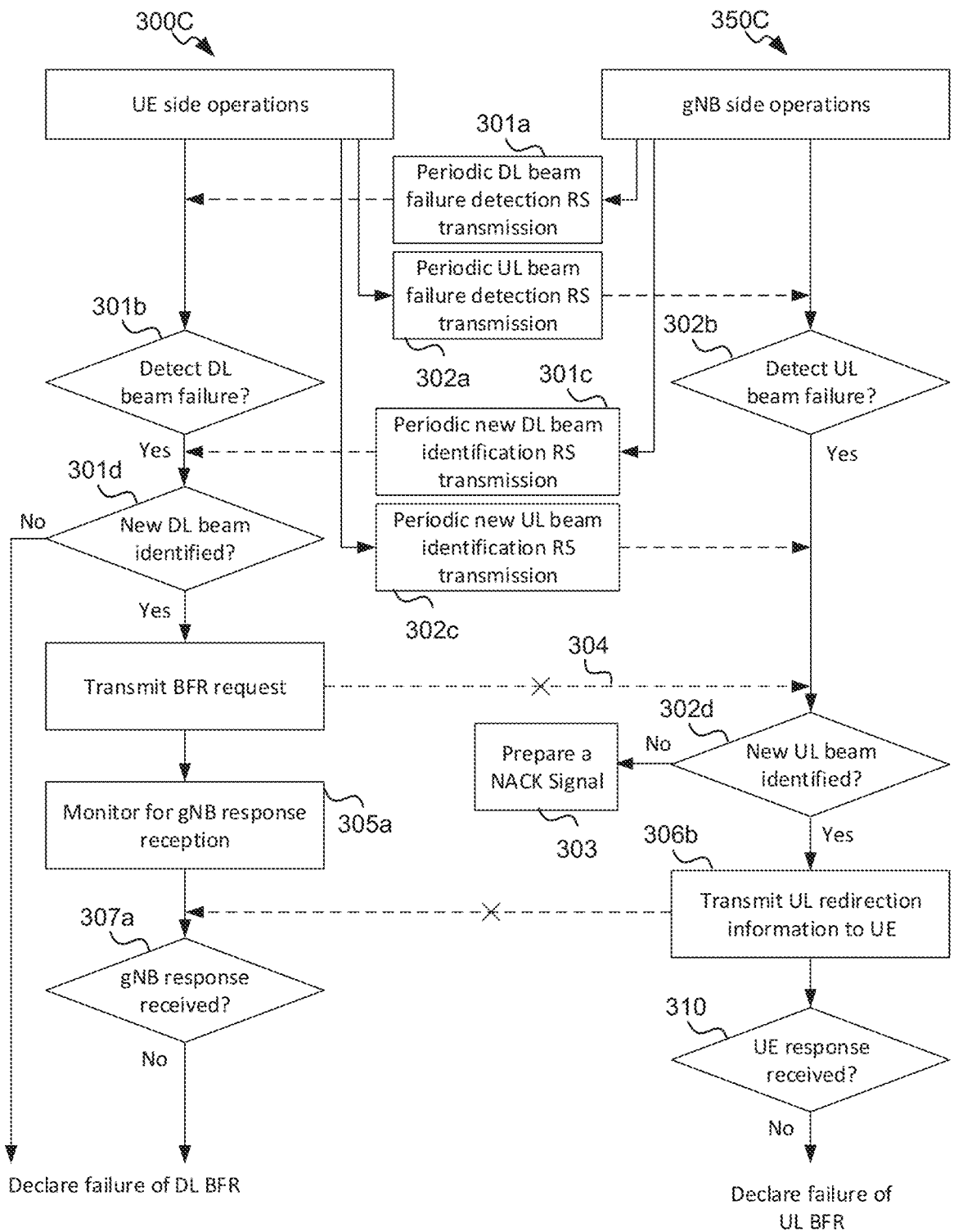
FIG. 3C is yet another flow diagram illustrating a method.

FIG. 3A is a flow diagram illustrating methods 300A and 350A according to an embodiment. FIG. 3A illustrates the above two-way BFR mechanism when the network node device 100 receives the BFR request from the UE 110. The last operations, i.e. the UE response transmission, may be optional since the network node device response transmission is done via the new DL beam that has been identified by the UE 110 to have satisfactory channel quality.

At operation 301*a*, the network node device performs periodic/aperiodic transmissions of DL beam failure detection RSs.

At operation 302*a*, the client device performs periodic/aperiodic transmissions of UL beam failure detection RSs.

At operation 301*c*, the network node device performs periodic/aperiodic transmissions of new DL beam identification RSs.

At operation 302*c*, the client device performs periodic/aperiodic transmissions of new UL beam identification RSs.

At operation 301*b*, the client device performs downlink beam failure detection based on the received DL beam failure detection RSs.

At operation 301*d*, the client device performs new DL candidate beam identification based on the received DL new candidate beam identification RSs, aiming at determining at least one new downlink candidate beam to replace the failed downlink beam. After determining at least one new downlink candidate beam, the client device generates a downlink beam failure recovery request indicating the at least one new downlink candidate beam determined to replace the at least one failed downlink beam.

At operation 302b, the network node device performs uplink beam failure detection based on the received UL beam failure detection RSs.

At operation 302d, the network node device performs new UL candidate beam identification based on the received UL new candidate beam identification RSs, aiming at determining or identifying at least one new uplink candidate beam to replace the detected at least one failed uplink beam.

At operation 304, the generated downlink beam failure recovery request is transmitted to the network node device by the client device. Further at operation 304, the downlink beam failure recovery request is received from the client device at the network node device. At operation 305a, the client device after transmitting the BFR request starts to monitor for receiving a response to the transmitted downlink beam failure recovery request from the network node device.

Then, the network node device generates uplink redirection information indicating the determined at least one new uplink candidate beam. Furthermore, the network node device generates a response comprising the generated uplink redirection information.

At operation 306a, the network node device transmits the generated response to the client device.

At operation 307a, the response to the transmitted downlink beam failure recovery request is received at the client device from the network node device. The response comprises the uplink redirection information indicating the at least one new uplink candidate beam determined to replace the at least one failed uplink beam.

Then, the client device configure itself to use the at least one new downlink candidate beam for a subsequent downlink reception, and/or to use the at least one new uplink candidate beam for a subsequent uplink transmission.

At optional operation 309, the client device generates a response to the received uplink redirection information and transmits the generated response to the network node device. At optional operation 310, the network node device receives the response to the transmitted uplink redirection information from the client device.

The method 350A may be performed by the network node device 100, and the method 300A may be performed by the client device 110. Further features of the method 350A directly result from the functionalities of the network node device 100, and further features of the method 300A directly result from the functionalities of the client device 110. The methods 300A and 350A can be performed by computer programs.

FIG. 3B is a flow diagram illustrating methods 300B and 350B according to an embodiment.

Operations 302a, 302b, 302c, 302d are similar to their counterparts in FIG. 3A so their detailed descriptions are not repeated here. Furthermore, operations 301a, 301b, 301c, 301d are not performed, as can be seen from FIG. 3B.

If, at operation 302d, the network node device successfully determines at least one new uplink candidate beam to replace the detected at least one failed uplink beam, the network node device generates uplink redirection information indicating the determined at least one new uplink candidate beam. Otherwise, the network node device prepares a negative acknowledgement signal, operation 303.

At operation 306b, the network node device transmits the generated uplink redirection information to the client device. Unlike in operation 306a of FIG. 3A, the uplink redirection information is not transmitted in a response to a downlink beam failure recovery request, as the network node device doesn't receive a downlink beam failure recovery request. Instead, the uplink redirection information may be transmitted e.g. via a physical downlink control channel (PDCCH).

Meanwhile, the client device started to monitor the PDCCH at operation 305b. At operation 307b, the client device receives the uplink redirection information. Then, the client device configure itself to use the at least one new uplink candidate beam for a subsequent uplink transmission.

Operations 309, 310 here are compulsory operation, which is different from their counterparts in FIG. 3A. This is because otherwise the network node device doesn't know whether the transmitted uplink redirection information has been successfully received by the client device or not. Their detailed descriptions are similar to their counterparts in FIG. 3A not repeated here.

The method 350B may be performed by the network node device 100, and the method 300B may be performed by the client device 110. Further features of the method 350B directly result from the functionalities of the network node device 100, and further features of the method 300B directly result from the functionalities of the client device 110. The methods 300B and 350B can be performed by computer programs.

FIG. 3C is a flow diagram illustrating methods 300C and 350C according to an embodiment.

Operations 301a, 301b, 301c, 301d, 302a, 302b, 302c, 302d, 303, 304, 305a, 306b, 307a, 310 are similar to their counterparts in FIGS. 3A and/or 3B so their detailed descriptions are not repeated here.

FIG. 3C illustrates an UL BFR mechanism when the network node device 100 fails to receive the BFR response from UE 110 in the presence of downlink beam failure. In other words, while the client device detects the downlink beam failure, either it fails to determine a new downlink candidate beam at operation 301d and in turn doesn't not generate and transmit a downlink beam failure recovery request, or it successfully determine at least on new downlink candidate beam at operation 301d and then generate/transmit a downlink beam failure recovery request at operation 304, but the downlink beam failure recovery request does not reach the network node device. Similarly, while the network node device transmits the generated uplink redirection information at operation 306b, the uplink redirection information does not reach the client device.

The method 350C may be performed by the network node device 100, and the method 300C may be performed by the client device 110. Further features of the method 350C directly result from the functionalities of the network node device 100, and further features of the method 300C directly result from the functionalities of the client device 110. The methods 300C and 350C can be performed by computer programs.

The functionality described herein can be performed, at least in part, by one or more computer program product components such as software components. According to an embodiment, the client device 110 and/or network device 100 comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

Herein, the terms 'beam' and 'beam pair' are used interchangeably.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus, wherein the apparatus comprises a network node device or is applicable in the network node device, the apparatus comprising:
   at least one processor; and
   one or more memories coupled to the at least one processor and storing programming instructions for execution by the at least one processor to:
      receive a downlink beam failure recovery request from a client device, wherein the downlink beam failure recovery request indicates at least one new downlink candidate beam determined to replace at least one failed downlink beam;
      detect at least one failed uplink beam while receiving the downlink beam failure recovery request from the client device;
      determine, according to reception of the downlink beam failure recovery request from the client device, at least one new uplink candidate beam to replace the detected at least one failed uplink beam;
      generate uplink redirection information indicating the determined at least one new uplink candidate beam;
      generate a response comprising the generated uplink redirection information; and
      transmit the generated response to the client device.

2. The apparatus according to claim 1, wherein the determination of the at least one new uplink candidate beam based on the reception of the downlink beam failure recovery request comprises determining the at least one new uplink candidate beam based on a time and frequency location of the received downlink beam failure recovery request.

3. The apparatus according to claim 1, wherein the determination of the at least one new uplink candidate beam based on the reception of the downlink beam failure recovery request comprises determining the at least one new uplink candidate beam based on a preamble in the received downlink beam failure recovery request.

4. The apparatus according to claim 1, wherein the determination of the at least one new uplink candidate beam based on the reception of the downlink beam failure recovery request comprises determining the at least one new uplink candidate beam based on a sounding reference signal received from the client device.

5. The apparatus according to claim 1, wherein the generated uplink redirection information comprises at least one of: an indication of an identity of the client device, an indication of the detected at least one failed uplink beam, or an identification of the determined at least one new uplink candidate beam.

6. The apparatus according to claim 1, wherein the generated response comprises a downlink control information format 0_1.

7. A method, wherein the method is applied to a network node device or an apparatus applicable in the network node device, the method comprising:
   receiving, from a client device by a network node device, a downlink beam failure recovery request, wherein the downlink beam failure recovery request indicates at least one new downlink candidate beam determined to replace at least one failed downlink beam;
   detecting, by the network node device, at least one failed uplink beam while receiving the downlink beam failure recovery request from the client device;
   determining, by the network node device, according to reception of the downlink beam failure recovery request from the client device, at least one new uplink candidate beam to replace the detected at least one failed uplink beam;
   generating, by the network node device, uplink redirection information indicating the determined at least one new uplink candidate beam;
   generating, by the network node device, a response comprising the generated uplink redirection information; and
   transmitting, by the network node device, the generated response to the client device.

8. The method according to claim 7, wherein the determination of the at least one new uplink candidate beam based on the reception of the downlink beam failure recovery request comprises determining the at least one new uplink candidate beam based on a time and frequency location of the received downlink beam failure recovery request.

9. The method according to claim 7, wherein the determination of the at least one new uplink candidate beam based on the reception of the downlink beam failure recovery request comprises determining the at least one new uplink candidate beam based on a preamble in the received downlink beam failure recovery request.

10. The method according to claim 7, wherein the determination of the at least one new uplink candidate beam based on the reception of the downlink beam failure recovery request comprises determining the at least one new uplink candidate beam based on a sounding reference signal received from the client device.

11. The method according to claim 7, wherein the generated uplink redirection information comprises at least one of: an indication of an identity of the client device, an indication of the detected at least one failed uplink beam, or an identification of the determined at least one new uplink candidate beam.

12. An apparatus, wherein the apparatus comprises a client device or is applicable in the client device, the apparatus comprising:
 at least one processor; and
 one or more memories coupled to the at least one processor and storing programming instructions for execution by the at least one processor to:
  transmit, to a network node device, a generated downlink beam failure recovery request, wherein the generated downlink beam failure recovery request indicates at least one new downlink candidate beam determined to replace at least one failed downlink beam; and
  receive, from the network node device, a response to the transmitted downlink beam failure recovery request, the response comprising uplink redirection information indicating at least one new uplink candidate beam determined to replace at least one failed uplink beam according to reception of the generated downlink beam failure recovery request from the client device.

13. The apparatus according to claim 12, wherein the uplink redirection information comprises at least one of: an indication of an identity of the client device, an indication of a detected at least one failed uplink beam, or an identification of the at least one new uplink candidate beam.

14. The apparatus according to claim 12, wherein the received response comprises a downlink control information format 0_1.

15. The apparatus according to claim 12, wherein the one or more memories store the programming instructions for execution by the at least one processor to:
 configure the client device to use the at least one new downlink candidate beam for a subsequent downlink reception; and
 configure the client device to use the at least one new uplink candidate beam for a subsequent uplink transmission.

16. A method, wherein the method is applied to a client device or an apparatus applicable in the client device, the method comprising:
 transmitting, to a network node device by a client device, a generated downlink beam failure recovery request, wherein the generated downlink beam failure recovery request indicates at least one new downlink candidate beam determined to replace at least one failed downlink beam; and
 receiving, at the client device from the network node device, a response to the transmitted downlink beam failure recovery request, the response comprising uplink redirection information indicating at least one new uplink candidate beam determined to replace at least one failed uplink beam according to reception of the generated downlink beam failure recovery request from the client device.

17. The method according to claim 16, wherein the uplink redirection information comprises at least one of: an indication of an identity of the client device, an indication of a detected at least one failed uplink beam, or an identification of the at least one new uplink candidate beam.

18. The method according to claim 16, wherein the received response comprises a downlink control information format 0_1.

19. The method according to claim 16, further comprising:
 configuring the client device to use the at least one new downlink candidate beam for a subsequent downlink reception; and
 configuring the client device to use the at least one new uplink candidate beam for a subsequent uplink transmission.

* * * * *